United States Patent Office 3,297,721
Patented Jan. 10, 1967

---

3,297,721
BORON-CONTAINING COMPOUNDS
Daniel Grafstein, Morristown, and Harry F. Smith, Wayne, N.J., assignors to Thiokol Chemical Corporation, Trenton, N.J., a corporation of Delaware
No Drawing. Filed Nov. 27, 1964, Ser. No. 414,943
7 Claims. (Cl. 260—343.6)

This invention relates to novel boron-containing compounds and more patricularly to a novel monomer which may be used for preparing polymers in condensation polymerization processes and a lactone intermediate useful in the production of the monomer.

In recent years, there has been considerable interest in boron-containing compounds because the high heat of combustion of these compounds renders them useful as components in rocket fuels. According to the present invention, boron compounds have been prepared, which compounds are useful for preparing boron-containing, polymeric propellant binders. Moreover, the compounds of the present invention are themselves useful as high-energy fuels and fuel additives. The solid products of this invention can be used as components in solid propellants for rocket power plants and other jet-propelled devices when mixed with siutable oxidizers such as ammonium, potassium, or sodium perchlorates, ammonium nitrate, etc. Such propellant mixtures may be compounded by a number of techniques known to the art. For example, the mixtures may comprise from 5 to 35 parts by weight of boron-containing materials and from 65 to 95 parts by weight of solid oxidizing agents mixed therewith. In some cases the propellant may also be made by combining the boron compounds and oxidants with a curable polymer, especially curable polymers of the polysulfide, polyurethane, polyester or polyether types.

The products of the invention may also be used as additives in high energy liquid fuels by mixing the products with combustible liquids such as compatible hydrocarbon fuels.

The boron-containing compounds of the invention may all be considered derivatives of carborane, which is a compound of carbon, hydrogen and boron, having the empirical formula $C_2H_{12}B_{10}$. Carborane is a solid material melting at 287°–288° C. It is characterized by a surprisingly stable nuclear structure and two labile hydrogen atoms, one connected to each carbon atom. It may be conveniently represented by using the formula H$\theta$H where $\theta$ represents the carboranyl group —$C_2H_{10}B_{10}$— of the formula

wherein the circle reprents the generalized, delocalized pi-bonding between the boron and carbon atoms. While there is some difference of opinion as to the molecular structure of carborane, its stability is usually attributed to a basket-shaped molecular configuration in which the ten boron atoms and two carbon atoms may be arranged at the apices of an icosahedron.

The novel monomers of the present invention are prepared by a two-step process, the first of which is subjecting bis(2-carboxy-1-carboranylmethyl)ether to pyrolysis. On pyrolysis, lactone of 1-hydroxymethyl-2-carboranyl carboxylic acid is obtained. This lactone of the formula

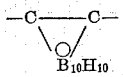

may be hydrolyzed in an aqueous alkaline solution to form an alkaline melt salt of the formula HOCH$_2\theta$COOX where X stands for a metal atom, for example sodium, potassium or cesium.

The metal salt may then be hydrolyzed to form a free hydroxy acid by acidifying the alkaline solution with dilute acid.

The starting material for the process of the present invention, bis(2-carboxy - 1 - carboranylmethyl)ether, is formed by reacting bis(1-carboranylmethyl)ether with an organolithium compound, for example butyllithium, thus replacing labile hydrogens on the 1-carbonylmethyl groups with lithium atoms to form bis(2-lithium-1-carboranylmethyl)ether, and thereupon reacting the lithium-substituted ether with carbon dioxide gas. When the product of this latter reaction is hydrolyzed, bis(2-carboxy-1-carboranylmethyl)ether of the formula $$(HO_2C\theta CH_2)O$$

is formed. This process is described fully in the commonly owned and copending application Serial No. 269,838 of Fein et al., filed March 28, 1963.

Among the alkaline materials useful in hydrolyzing the lactone compound are such dilute bases as may be prepared from potassium hydroxide, ammonium hydroxide, cesium hydroxide and sodium hydroxide. Dilute solutions of such compounds as acetic acid, sulfuric acid, nitric acid and hydrochloric acid are all useful in acidifying the alkali metal salt to form the free hydroxy acid of the formula HOCH$_2\theta$COOX.

The pyrolysis reaction whereby the lactone of 1-hydroxymethyl-2-carboranyl carboxylic acid is prepared can be advantageously carried out at temperatures from 250°–300° C. The subsequent hydrolysis and acidification reactions are preferably carried out at 0° to 25° C. These latter reactions may be carried out at higher or lower temperatures as may be convenient. However, the temperature at all times must be maintained below the decomposition temperature of the reactants and the products.

In order to point out more fully the nature of the present invention, the following specific example is given as an illustrative embodiment of the present process and products produced thereby.

Two grams of bis(2-carboxy-1-carboranylmethyl)ether were heated in an inert atmosphere at about 270° C. for 6 hours during which time a white crystalline solid formed. The solid was identified as the lactone of 1-hydroxymethyl-2-carboranyl carboxylic acid after being purified by recrystallization from a pentane-ethyl ether miture. The lactone had a melting point of 251°–252.5° C. The amount of lactone recovered was equal to 55% of the amount theoretically possible from a complete conversion of the ether.

A chemical analysis was run on the compound with the following results:

|  | C | H | B |
|---|---|---|---|
| Theoretical | 23.98 | 6.04 | 54.02 |
| Experimental | 22.80 | 6.21 | 55.01 |

The infra-red absorption spectrum of the product together with the indicated analytical data confirmed the structure of the product to be

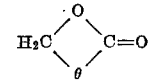

A solution containing 2 grams of sodium hydroxide in 20 ml. of water was prepared. Into this solution 0.48 gram of the lactone was suspended. The suspension was agitated for 92 hours at temperatures ranging between 12° and 18° C. During this 92-hour period the lactone appeared to go into solution. When this solution was acidified with dilute aqueous hydrochloric acid and concentrated, by evaporation of the water, to a volume of 12 ml. a crystalline material separated out. This material was extremely heat sensitive. When an attempt was made to obtain a melting point, the material decomposed. The temperature of decomposition depended on the rate of heating. The material was identified as 1-hydroxymethyl-2-carboranyl carboxylic acid of the formula $HOCH_2\theta CO_2H$. This identification was made by infra-red absorption analysis and a chemical analysis, the results of which follow:

|  | C | H |
|---|---|---|
| Percent calculated | 22.00 | 6.46 |
| Percent found | 21.71 | 6.62 |

The quantity of this material obtained equalled 92% of the yield theoretically possible.

It is, of course, to be understood that the foregoing example is intended to be illustrative and that numerous changes can be made in proportions and conditions set forth therein without departing from the spirit of the invention as defined in the appended claims.

We claim:

1. A compound selected from the group of compounds having the formulas

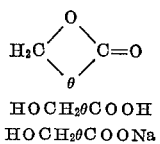

$HOCH_2\theta COOH$ $HOCH_2\theta COONa$ wherein $\theta$ in each formula represents $-C_2B_{10}H_{10}-$.

2. A compound of the formula

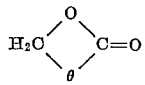

wherein $\theta$ represents $-C_2B_{10}H_{10}-$.

3. A compound of the formula $HOCH_2\theta COOH$, wherein $\theta$ represents $-C_2B_{10}H_{10}-$.

4. A compound of the formula $HOCH_2\theta COONa$, wherein $\theta$ represents $-C_2B_{10}H_{10}-$.

5. A process for making a compound of the formula $HOCH_2\theta CO_2H$, wherein $\theta$ represents $-C_2B_{10}H_{10}-$, which comprises heating bis(2-carboxyl-1-carboranylmethyl) ether to a temperature above 250° C. to form a lactone of the formula

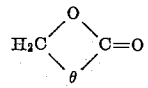

wherein $\theta$ has the meaning given above, reacting said lactone with an aqueous alkali, acidifying the resulting solution, and recovering said compound therefrom.

6. A process for making a lactone of the formula

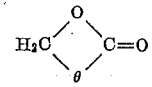

wherein $\theta$ represents $-C_2B_{10}H_{10}-$, comprising heating bis(2-carboxyl-1-carboranylmethyl)ether at a temperature above 250° C. to form said lactone and recovering said lactone from the reaction products.

7. A process for making a compound of the formula $HOCH_2\theta CO_2H$, wherein $\theta$ represents $-C_2B_{10}H_{10}-$, which comprises reacting a lactone of the formula

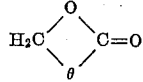

wherein $\theta$ has the meaning given above, with an aqueous alkali, hydrolyzing the resultant alkaline solution with dilute acid, and recovering said compound.

References Cited by the Examiner

UNITED STATES PATENTS 3,151,169   9/1964   Hawthorne et al. ____ 149—22 X
3,153,056   10/1964   Ager et al. _____ 149—22 X ALEX MAZEL, *Primary Examiner.*

L. A. SEBASTIAN, J. A. NARCAVAGE,

*Assistant Examiners.*